United States Patent
Fuhrman et al.

(10) Patent No.: US 9,563,523 B2
(45) Date of Patent: Feb. 7, 2017

(54) ARCHITECTURE FOR SCALABLE FAULT TOLERANCE IN INTEGRATED FAIL-SILENT AND FAIL-OPERATIONAL SYSTEMS

(71) Applicant: GM GLOBAL TECHNOLOGY OPERATIONS LLC, Detroit, MI (US)

(72) Inventors: Thomas E. Fuhrman, Shelby Township, MI (US); Soheil Samii, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 109 days.

(21) Appl. No.: 14/688,083

(22) Filed: Apr. 16, 2015

(65) Prior Publication Data

US 2016/0306720 A1    Oct. 20, 2016

(51) Int. Cl.
*G06F 11/00* (2006.01)
*G06F 11/20* (2006.01)

(52) U.S. Cl.
CPC ..... *G06F 11/2028* (2013.01); *G06F 2201/805* (2013.01)

(58) Field of Classification Search
CPC .............. G06F 11/2033; G06F 11/2035; G06F 11/2046; G06F 11/2097; G06F 11/2092; G06F 11/0772; G06F 11/0778; G06F 11/2064; G06F 11/2071; G05B 19/0428; G05B 19/058; G05B 19/4184; G05B 2219/24177; G05B 2219/24183
See application file for complete search history.

(56) References Cited

U.S. PATENT DOCUMENTS

| | | | | |
|---|---|---|---|---|
| 4,807,516 A | * | 2/1989 | Takats | G05D 1/0077 244/194 |
| 6,389,559 B1 | * | 5/2002 | Sawdy | G06F 11/2092 711/114 |
| 7,069,468 B1 | * | 6/2006 | Olson | G06F 11/2092 714/4.2 |
| 8,340,793 B2 | * | 12/2012 | Kamenetz | G05B 19/0428 700/82 |

(Continued)

*Primary Examiner* — Nadeem Iqbal
(74) *Attorney, Agent, or Firm* — Quinn Law Group

(57) ABSTRACT

An integrated fail-silence and fail-operational control system includes a primary controller controlling features of devices while operating under non-fault operating conditions. A secondary controller includes a fail detector/decider module monitoring faults in the primary controller. The fail detector/decider module determines whether the fault in the primary controller is associated with a fail-silence requirement or a fail-operational requirement. If the fail detector/decider module determines the fault is a fail-silence requirement, then the fail detector/decider module actuates a shutdown command to the primary controller to shut down a feature affected by the fault where the feature becomes non-operational. If the fail detector/decider module determines that the feature associated with the fault is a fail-operational requirement, then the fail detector/decider module signals the primary controller to relinquish controls of the feature to the secondary controller. The secondary controller functions as a high assurance system for controlling the feature in a fail-operational mode.

20 Claims, 3 Drawing Sheets

(56) References Cited

U.S. PATENT DOCUMENTS

| | | | |
|---|---|---|---|
| 8,935,015 B2 * | 1/2015 | Olsoe | B64C 13/42 |
| | | | 701/3 |
| 9,195,232 B1 * | 11/2015 | Egnor | B60W 30/00 |
| 2011/0087343 A1 * | 4/2011 | Kamenetz | G05B 19/0428 |
| | | | 700/82 |
| 2014/0277608 A1 * | 9/2014 | Debouk | G05B 9/03 |
| | | | 700/79 |

* cited by examiner

ARCHITECTURE FOR SCALABLE FAULT TOLERANCE IN INTEGRATED FAIL-SILENT AND FAIL-OPERATIONAL SYSTEMS

BACKGROUND OF INVENTION

An embodiment relates to fault tolerant control systems.

Systems which provide safety functions typically utilize redundant controllers to ensure safety by shutting down functions that have experienced a fault or failure. Such systems are known as fail-silent systems. If a fault is detected, controls are shut down for the feature and the feature will no longer be operable in the system.

Some systems try to implement control systems utilizing a fail-operational system where additional controllers are used to ensure that a safe operation can be continued for a duration of time, such as dual duplex controllers. If a first controller fails and falls silent, a second controller will be activated and all actuators will switch over to rely on requests from the second controller. The issue with duplex designs is that due to fact that the controllers are essentially identical, they carry the same defects, particularly software defects. Since the software is identical, both controllers will inherently have the same issues if a software related defect occurs. As a result, in a system that uses symmetrical implementation of controllers, which are essentially exact copies of each function, such systems provide little assistance with respect to software faults.

Other types of systems that utilize non-symmetrical implementation of controllers may avoid duplicative hardware and software faults; however, utilizing a second non-symmetric controller that includes the necessary software and hardware for controlling all features controlled by the first non-symmetrical controller is costly.

SUMMARY OF INVENTION

An advantage of an embodiment is a scalable fault-tolerant architecture system that supports arbitrary combination of both fail-silent and fail-operational feature requirements in a single architectural pattern. The architectural design reduces costs and increases coverage of software design faults. The system integrates error detection and fault determination into a single module which can monitor both fail-silent and fail-operational features of a system. The module determines if the fault is related to a feature associated with a fail-silent requirement or a fail-operational requirement. If the fault is associated with a fail-silent requirement, then the feature associated with the fault becomes nonoperational in the system; however the primary controller can still continue to control other features not affected by the fault. If the fault is associated with a fail-operational requirement, then control over the feature is relinquished by the primary control module to a secondary controller for monitoring and controlling the feature. Another advantage of the system is that only software for features that are identified as fail-operational features are stored on the secondary controller. As a result, the processor and memory can be downsized due to the reduced complexity and computational requirements.

An embodiment contemplates a fault control strategy for an integrated fail-silence and fail-operational control system. A primary controller is provided to control features of devices while operating under non-fault operating condition. A secondary controller is provided including a fail detector/decider module. The fail detector/decider module monitors faults in the primary controller and the secondary controller. The fail detector/decider module determines whether a fault in the primary controller is a fail-silence requirement or a fail-operational requirement. A shutdown command is actuated to the primary controller, by the fail-silence detector/decider, to shut down the feature affected by the fault where the feature becomes non-operational in response to the fail detector/decider module determining that the fault is a fail-silence requirement. Control of the feature is relinquished to the secondary controller in response to the fail detector/decider module determining that the feature associated with the fault is a fail-operational requirement. The secondary controller functions as a high assurance system for controlling the feature in a fail-operational mode.

An embodiment contemplates an integrated fail-silence and fail-operational control system. A primary controller controls features of devices while operating under non-fault operating conditions. A secondary controller includes a fail detector/decider module. The fail detector/decider module monitors faults in the primary controller and the secondary controller. The fail detector/decider module determines whether the fault in the primary controller is associated with a fail-silence requirement or a fail-operational requirement. If the fail detector/decider module determines the fault is a fail-silence requirement, then the fail-silence detector/decider actuates a shutdown command to the primary controller to shut down a feature affected by the fault where the feature becomes non-operational. If the fail detector/decider module determines that the feature associated with the fault is a fail-operational requirement, then the fail detector/decider module signals the primary controller to relinquish controls of the feature to the secondary controller. The secondary controller functions as a high assurance system for controlling the feature in a fail-operational mode.

DETAILED DESCRIPTION

Figure 1:
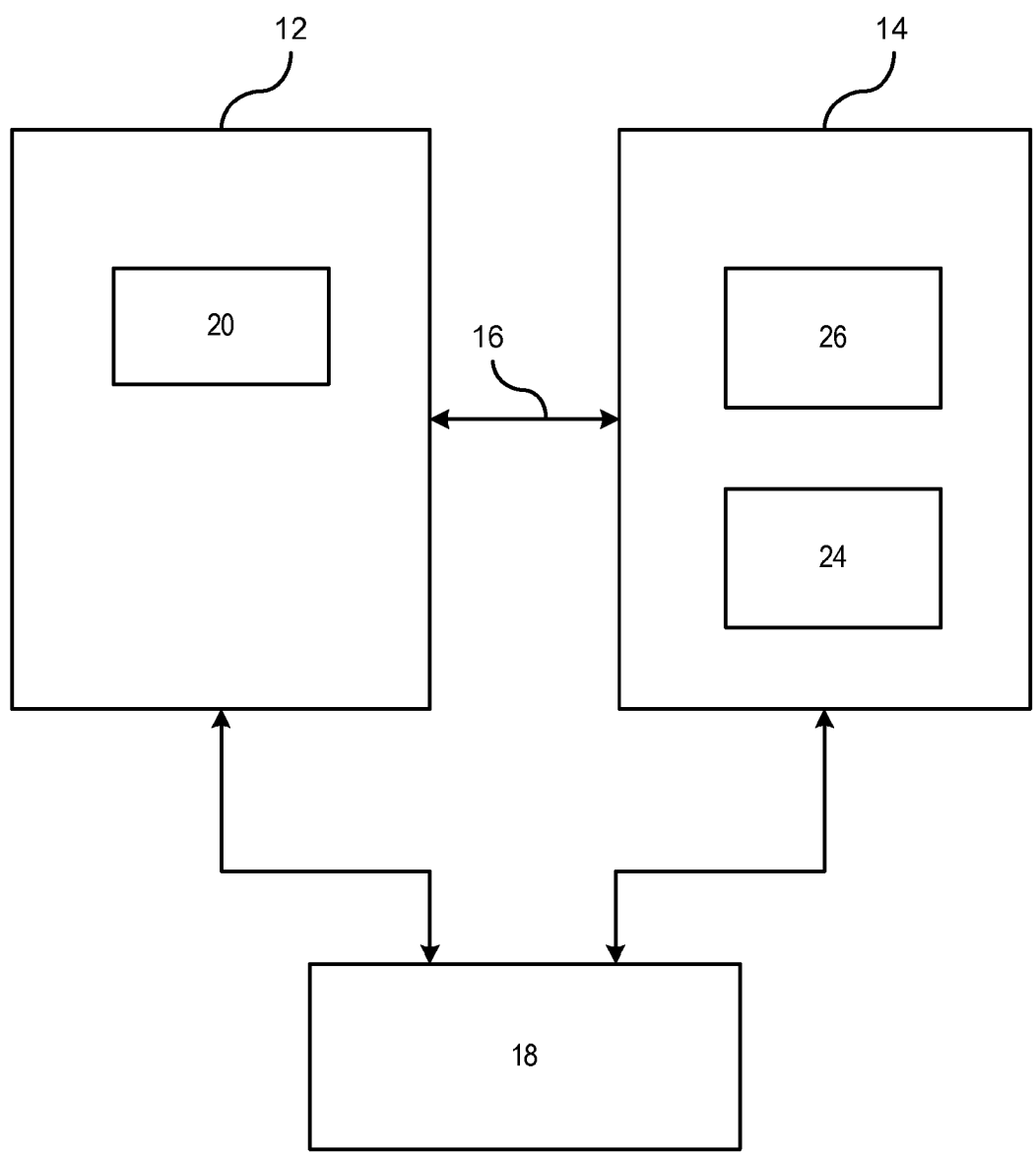
FIG. 1 is an architectural block diagram of an integrated fail-silence and fail-operational control system.

There is shown in FIG. 1 an architectural block diagram of an integrated fail-silence and fail-operational control system. Control systems, including, but not limited to vehicles, planes, and ships that utilize safety-critical systems or autonomous systems, requires fault-tolerant countermeasures should an error occur within the control system. Such control systems will often utilize two controllers so that if an error occurs (which results from a fault) with a primary controller, then a backup controller may be readily enabled to control a feature of the control system or provide control for limited functionality of the feature in error. However, if a secondary controller is identical to the primary controller, then faults in the primary controller that are the result of software will inherently have the same defects in the software of the secondary controller since the software is identical. Therefore, an integrated high performance system and high assurance system is utilized and described herein.

In FIG. 1, a system is shown to include a primary controller 12 and a secondary controller 14. The exemplary system as described herein is vehicle based, but as described earlier, the architecture can apply to non-vehicular systems.

A communication bus 16 provides communication between the primary controller 12 and the secondary controller 14. Actuators 18 include devices for actuating a feature of the system. The actuators 18 may include features that are controlled only by the primary controller, and under a fail-silence condition where a fault occurs within the primary controller related to that feature, operation of the respective feature is de-actuated. The actuators 18 may further include features that operate under a fail-operational condition where the devices are controlled by both the primary controller 12 and the secondary controller 14. Under a fail-operation condition, the features are no longer monitored and controlled by the primary controller; however, the devices remain operational in a limited manner to maintain partial operation of the feature if the feature has been previously determined during design stages to be critical to the vehicle that the feature cannot be fully shutdown. Typically, such features are those that are either critical or are required by the vehicle to maintain at least some safe operation of the vehicle.

The primary controller 12 includes a processor including primary controls 20. The primary controller 12 operates under non-failure operating conditions (herein referred to as normal operating conditions) and will generate and transmit control signals as for controlling features of the vehicle device 18.

A secondary controller 14 includes a processor including fail operational controls 24 for controlling operations of selected actuators during fail-operational conditions. The secondary controller 14 operating in a fail-operational operating mode generates control signals for enabling certain features of the system to maintain operations to ensure that the system can operate even if only in a limited manner. Such control devices are typically critical devices that include, but are not limited to braking controls and steering controls. Under a fail-operation condition, functionality to critical devices, although limited, is enabled to allow the driver to safely operate the vehicle until the vehicle can be driven to a location for inspection.

The secondary controller 14 further includes a fail-silence decoder/decider module 26 for monitoring error conditions in both the primary controller 12 and the secondary controller 14. Unlike other known systems, wherein each controller includes a monitoring system, the architecture described herein utilizes a single fail-silence decoder/decider module 26 that monitors fault conditions of both the primary controller 12 and secondary controller 14 and generates control signals for shutting down and/or switching controllers.

Figure 2:
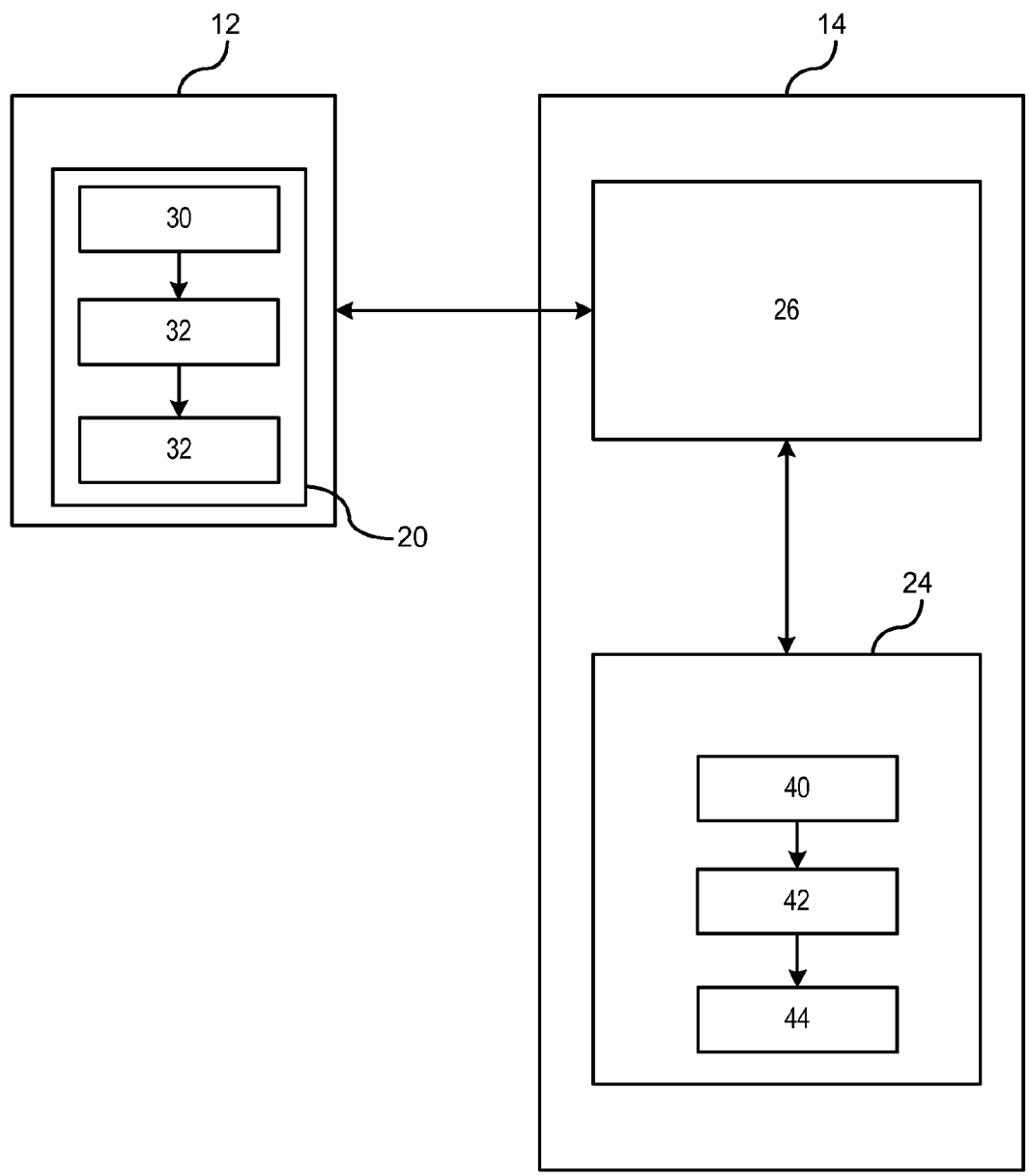
FIG. 2 is an expanded block diagram of the primary controller and the secondary controller.

FIG. 2 is an expanded block diagram of the primary controller 12 and the secondary controller 14. The primary controls 20 of the primary controller 12 receive input signals/data 30 from various devices or sensors throughout the vehicle. Control actions 32 are determined by the primary controls 20 based on the received input signals/data 30 obtained by the various devices and sensors during normal operating conditions. Outputs signals/commands 34 are communicated by the primary controls 20 to vehicle actuators or systems for controlling operations of features during normal operating conditions.

The secondary controller 14 includes the fail detector/decider module 26 for monitoring fault conditions within the primary controller 12. The responsibility of the fail detector/decider module 26 is to detect an erroneous unsafe condition within the primary controller 12 and determine whether the unsafe condition should result in a fail-silence condition or a fail-operational condition. It is understood that the error detection portion of the fail detector/decider module 26 is common for both fail-silence and fail-operational conditions. The only difference between the fail-silence and fail-operational features is the action to be taken by the primary controller 12 and secondary controller 14 upon detection of the error. For fail-silence features, the required action is to shut down the feature associated with the error, whereas for fail-operational features, the required action to be taken is to switch control from the primary controller 12 to the secondary controller 14.

The secondary controller 14 functions as a high assurance system based on a simplex pattern that serves as the fail-operational control. The high assurance system is needed only in the case of fail-operational features. The data and associated software incorporated in the secondary controller 14 for executing fail-operational features may be very small in comparison to the primary controller 12 because the secondary controller 14 only implements the bare minimal fail-operational behavior, which may be of a lower performance requirement or reduce functionality compared to the functionality required by the primary controller 12. In addition, the secondary controller 14 only implements a fraction of the features that are implemented in the primary controller 12. For example, if a respective system includes 90% fail-silence features and only 10% fail-operational features, only the 10% fail-operational features are needed to be stored in secondary controller 14. The rationale is that so long as the system is operating in a normal operation mode with no errors, the primary controller 12 maintains control of the features the vehicle. The secondary controller 14 is only enabled when the primary controller 12 produces errors in the system and the feature is determined to be unreliable. As a result, the secondary controller 14 only requires the minimum amount of software required to maintain limited operation for those respective features that are deemed necessary to operate the features of the system.

In response to a determination by the fail silence detector/decider 26 that the controls should be switched to the high assurance mode of the secondary controller 14, fail-operational controls are thereafter executed by the microprocessor secondary controller 14. The microprocessor of the secondary controller 14 receives input signals/data 40 from various devices or sensors throughout the vehicle. Control actions 42 are determined by the fail-operational controls 24 based on the received input signals/data 40 obtained by the various devices and sensors during fail-operational conditions. Outputs signals/commands 44 are communicated by the fail-operational controls 24 to vehicle actuators for controlling fail-operational features during the fail-operational mode. As described earlier, since the fail-operational features are small in comparison to the fail-silence features, a smaller size microprocessor as well as memory may be utilized in the secondary controller 14.

Figure 3:
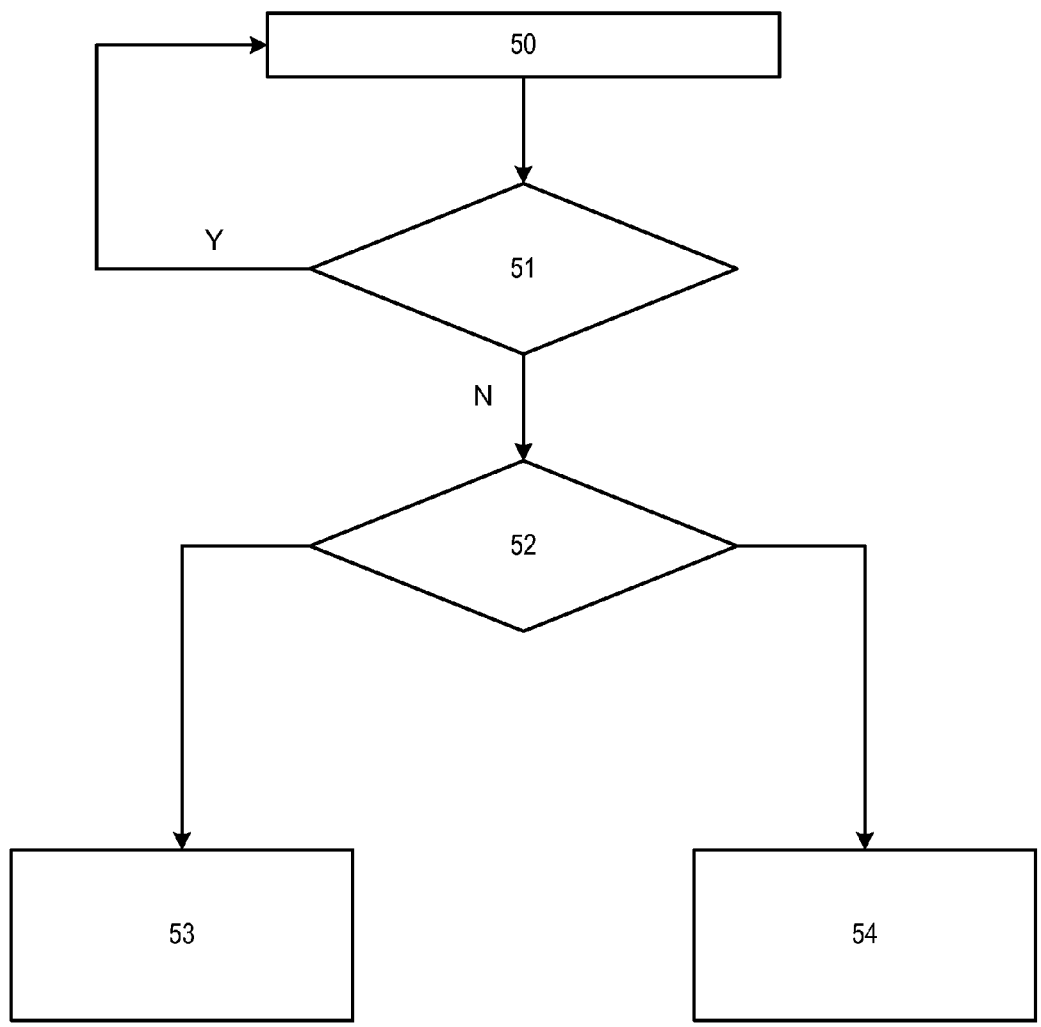
FIG. 3 illustrates flowchart for detecting and enabling a fail-silent or fail-operational mode.

FIG. 3 illustrates a flowchart for a controlling strategy within the secondary controller for detecting an error and determining whether to enable fail-silence features or fail-operational features.

In block 50, fault conditions are monitored by the fail-silence decoder/decider module of the secondary controller. The fail-silence detector/decider determines the type of faults and a severity of the faults associated with the primary controller.

In block 51, the fail detector/decider module evaluates the correctness and safety of each of the controls of the primary controller in a repeating loop. This is performed regardless of whether the primary control is fail-silence or fail-operational. If a determination is made that the controls output by the primary controller are correct, then a return is made to step 50 to continue to analyze outputs and faults. Under this condition, the primary controller is enabled and maintains control over the feature. If the determination is made in block 51 that the controls are either incorrect or unsafe, then the routine proceeds to step 52.

In step 52, the fail silence detector/decider module determines whether the feature associated with the fault is a fail-silence requirement or a fail-operational requirement. If the determination is made that the feature is categorized as a fail-silence requirement, then the routine proceeds to step 53; otherwise, the routine proceeds to step 54.

In step 53, in response to a determination that a fail-silence condition is present, the primary controller enters a fail-silence mode with respect to the controlling operations of that feature. In a fail-silence mode, the respective feature for the device/system becomes non-operational and no control signals relating to the respective feature are communicated. Neither the primary controller nor the secondary controller can enable the faulty features. It should be understood that the features that are identified as a fail-silence during the design state are features that are typically not critical to functionality of the vehicle or they vehicle operation is not dependent on the feature. Therefore, there is no control strategy within the secondary controller for maintaining operation of the feature.

It is also understood that the primary controller may control various features within a system or a vehicle. Therefore, if a fault occurs in the primary controller with respect to a feature controlled by primary controller, then only the operation of that feature becomes inoperable. The primary controller may continue monitoring and control other features not affected by the fault.

In step 54, in response to a determination in step 52 that the feature is categorized as a fail-operational requirement, the primary controller relinquishes control of the faulted feature to the secondary controller. In a fail-operational condition, the secondary controller maintains operation of the respective feature. The feature may have a varying degree of functionality which is preprogrammed during design stages. Typically, the secondary controller will operate as a high assurance system, which allows the design to be a lighter weight controller in comparison to the primary controller. The term lightweight as used herein refers to a system that is less computationally intensive in contrast to the primary controller. Moreover, the secondary controller maintains increased assurance of data integrity and accuracy based on the data utilized in making its determinations. Therefore, only that software and associated operations are programmed into the controller that provides greater assurance that the feature can be operated to maintain some operation of the feature that may be critical to the system, but the feature may operate in a reduced manner. While the secondary controller maintains operation for the respective feature associated with the fault, the primary controller will no longer have any involvement or control with respect to this feature; however, the primary controller will maintain analysis and control over other features not affected by the fault.

While certain embodiments of the present invention have been described in detail, those familiar with the art to which this invention relates will recognize various alternative designs and embodiments for practicing the invention as defined by the following claims.

What is claimed is:

1. An integrated fail-silence and fail-operational control system comprising:

a primary controller controlling features of devices while operating under non-fault operating conditions;

a secondary controller including a fail detector/decider module, the fail detector/decider module monitoring faults in the primary controller and the secondary controller, the fail detector/decider module determining whether the fault in the primary controller is associated with a fail-silence requirement or a fail-operational requirement, wherein if the fail detector/decider module determines the fault is a fail-silence requirement, then the fail detector/decider actuates a shutdown command to the primary controller to shut down a feature affected by the fault where the feature becomes non-operational, and wherein if the fail detector/decider module determines that the feature associated with the fault is a fail-operational requirement, then the fail detector/decider module signals the primary controller to relinquish controls of the feature to the secondary controller, wherein secondary controller functions as a high assurance system for controlling the feature in a fail-operational mode.

2. The integrated fail-silence and fail-operational control system of claim 1 wherein each feature of the system is categorized as a fail-silence feature or a fail-operational feature.

3. The integrated fail-silence and fail-operational control system of claim 2 wherein the fail-silence detector/decider monitors and detects faults in the primary controller.

4. The integrated fail-silence and fail-operational control system of claim 3 wherein the fail detector/decider module detects erroneous or unsafe conditions within the primary controller.

5. The integrated fail-silence and fail-operational control system of claim 4 wherein the fail detector/decider module detection of faults in the primary controller is common between fail-silence features and fail-operational features.

6. The integrated fail-silence and fail-operational control system of claim 2 wherein the fail-silence detector/decider determines whether the feature associated with the fault is categorized as a fail-silence feature or a fail-operational feature.

7. The integrated fail-silence and fail-operational control system of claim 1 further comprising a fail-operational control module for controlling features categorized as fail-operational features, the fail-operational control module controlling fail-operational features in response to the fail detection/decider module determining that the fault is a fail-operational fault.

8. The integrated fail-silence and fail-operational control system of claim 7 wherein the primary controller relinquishes control of the feature associated with the fail-operational condition in response to a communication from the fail detector/decider module determining the fault is the fail-operational fault.

9. The integrated fail-silence and fail-operational control system of claim 1 wherein software for controlling only features categorized as fail-operational features are stored in the fail-operational control module of the secondary controller.

10. The integrated fail-silence and fail-operational control system of claim 9 wherein the fail-operational control module includes software for controlling fail-operational features at reduced functionality.

11. A fault control strategy for an integrated fail-silence and fail-operational control system comprising the steps of:

providing a primary controller controlling features of devices while operating under non-fault operating condition;

providing a secondary controller including a fail detector/decider module, the fail detector/decider module monitoring faults in the primary controller and the secondary controller;

determining, by the fail detector/decider module, whether a fault in the primary controller is a fail-silence requirement or a fail-operational requirement;

actuating a shutdown command to the primary controller, by the fail detector/decider, to shut down the feature affected by the fault where the feature becomes non-operational in response to the fail detector/decider module determining that the fault is a fail-silence requirement; and relinquishing control of the feature to the secondary controller in response to the fail detector/decider module determining that the feature associated with the fault is a fail-operational requirement, wherein the secondary controller functions as a high assurance system for controlling the feature in a fail-operational mode.

12. The fault control strategy of claim 11 wherein each feature of the system is categorized as a fail-silence feature or a fail-operational feature.

13. The fault control strategy of claim 12 wherein faults in the primary controller are monitored and detected in the fail detector/decider module.

14. The fault control strategy of claim 13 wherein erroneous or unsafe conditions within the primary controller are determined by the fail detector/decider module.

15. The fault control strategy of claim 14 wherein the fail detector/decider module detection of faults in the primary controller is common between fail-silence conditions and fail-operational conditions.

16. The fault control strategy of claim 12 wherein the fail-silence detector/decider determines whether the feature associated with the fault is categorized as a fail-silence feature or a fail-operational feature.

17. The fault control strategy of claim 11 further comprising the step of controlling, by a fail-operational control module, features categorized as fail-operational features, the fail-operational control module controlling fail-operational features in response to fail detection/decider module determining that the fault is a fail-operational fault.

18. The fault control strategy of claim 17 wherein control of the feature associated with the fail-operational condition is relinquished by the primary controller in response to a communication from the fail detector/decider module determining the fault is a fail-operational fault.

19. The fault control strategy of claim 11 wherein software for controlling only features categorized as fail-operational features is stored in the fail-operational control module of the secondary controller.

20. The fault control strategy of claim 19 wherein the fail-operational control module includes software for controlling fail-operational features at reduced functionality.

* * * * *